United States Patent Office 2,846,843
Patented Aug. 12, 1958

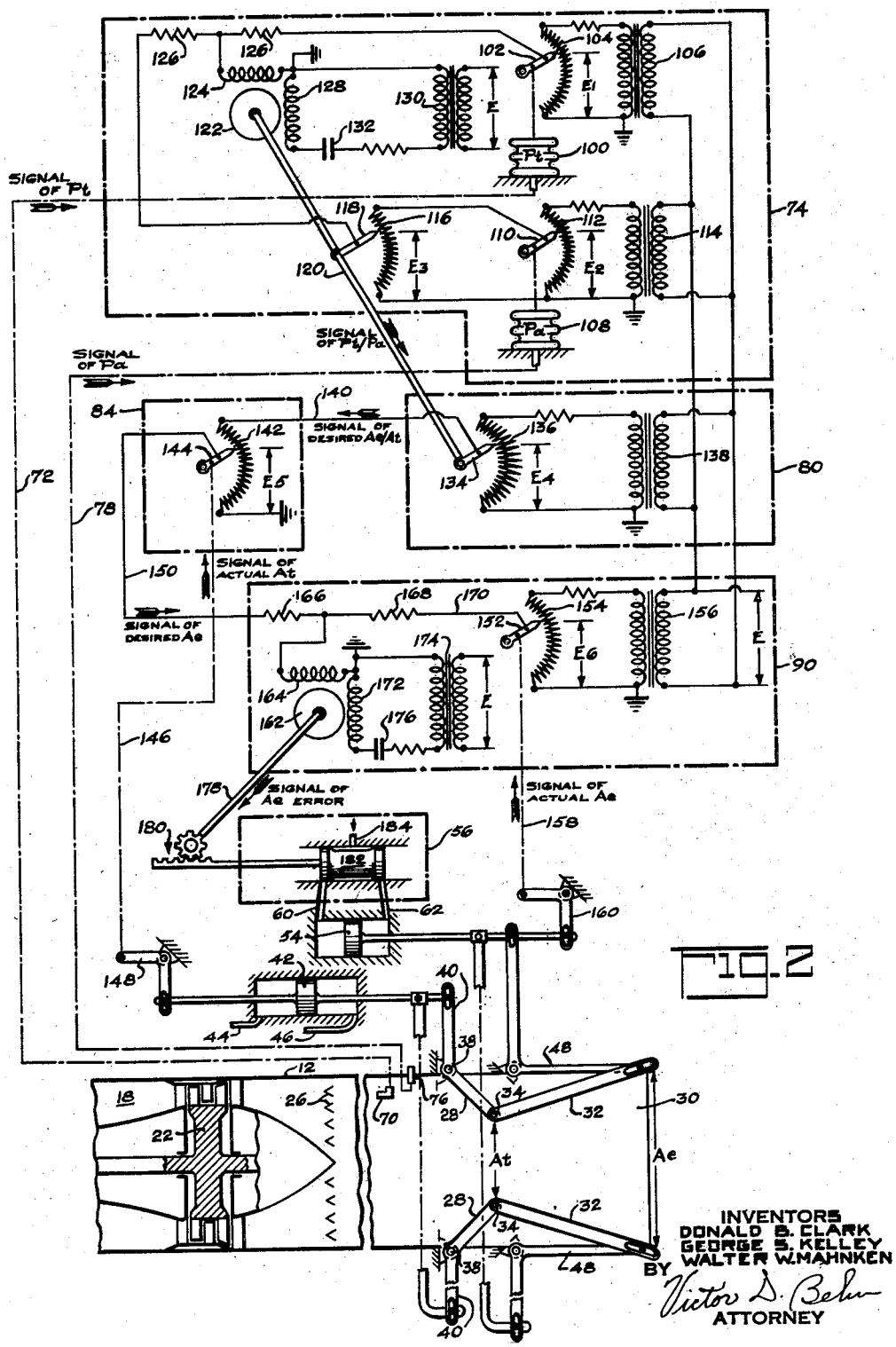

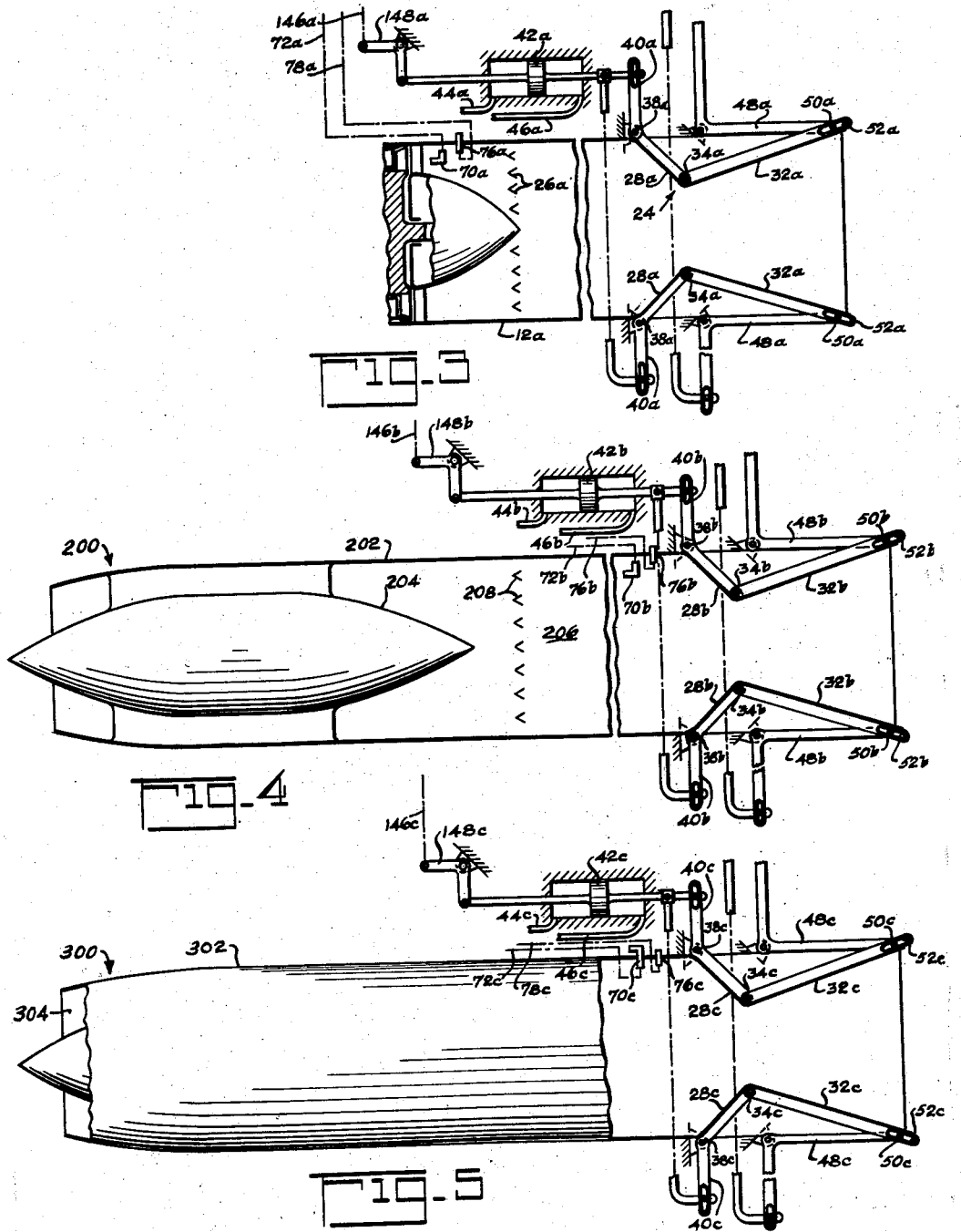

2,846,843

VARIABLE AREA CONVERGENT-DIVERGENT EXHAUST NOZZLE AND CONTROL THEREFOR

Donald B. Clark, Pines Lake, George S. Kelley, Ridgewood, and Walter W. Mahnken, Union City, N. J., assignors to Curtiss-Wright Corporation, a corporation of Delaware Application January 7, 1953, Serial No. 329,956

11 Claims. (Cl. 60—35.6)

This invention relates to jet engine exhaust nozzles and is particularly directed to means for automatically regulating the exit or discharge area of a nozzle having a downstream divergent portion.

The exhaust nozzle of an aircraft jet engine may have a convergent-divergent profile for maximum fuel economy and engine performance particularly in the case of engines designed for high speed flight. During normal operation of such an aircraft jet engine nozzle the exhaust gas flow through the divergent portion of the nozzle is supersonic. Copending application Serial No. 311,918, filed September 27, 1952, discloses a mechanism for automatically varying the exit area of such a jet engine convergent-divergent exhaust nozzle so that the exhaust gases expand through the divergent nozzle portion approximately down to the pressure of the surrounding atmosphere whereby the forward thrust force of the exhaust gases on the divergent nozzle portion is a maximum. As disclosed in said copending application the pressure in the nozzle is measured adjacent to the nozzle exit and the nozzle exit is varied so that said measured nozzle pressure is approximately equal to that of the surrounding atmosphere. Basically the system of said copending application is quite simple. However, at least in certain installations said nozzle pressure may be difficult to measure. In addition, because any change in the nozzle exit area affects said measured nozzle pressure, the system of said copending application may hunt under certain circumstances, for example if the system is made too sensitive.

An object of the present invention comprises the provision of a novel mechanism for automatically controlling the exit area of jet engine exhaust nozzle having a diverging downstream portion such that nozzle exit area is controlled by factors which are not affected by changes in said area and said factors are relatively easy to measure.

Other objects of the invention will become apparent upon reading the annexed detailed description in connection with the drawing in which:

Fig. 2 is a view similar to Fig. 1 but illustrating a particular form of the nozzle control system;

Fig. 3 is a partial view illustrating a slight modification of Fig. 1;

Fig. 4 is a partial view of a modification similar to Fig. 1 but illustrating the invention applied to a ram-jet engine; and Fig. 5 is a partial view of a further modification of the invention.

Figure 1:
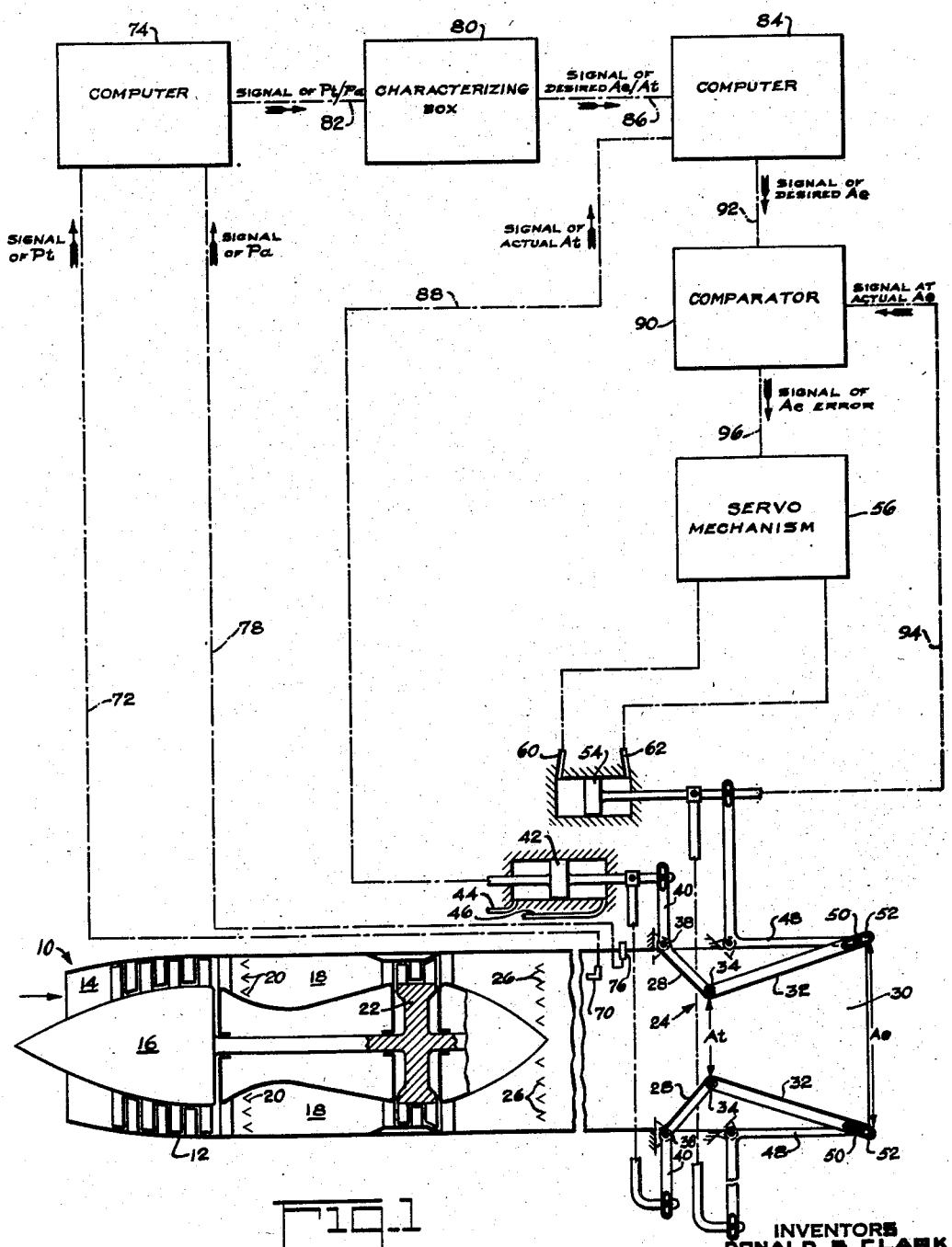
Fig. 1 is a schematic view of a turbo-jet engine with a variable area exhaust nozzle and in block diagram, an exhaust nozzle control system embodying the invention.

Referring to Fig. 1 of the drawing, reference numeral 10 designates an aircraft turbo-jet engine. As illustrated, the engine 10 comprises an outer shell or duct 12 having a forwardly directed air inlet 14 at its forward end, an air compressor 16 which receives air from the inlet 14, a combustion chamber 18 which receives compressed air from the compressor 16 and fuel from burner apparatus 20, and a turbine 22 which is driven by the gases from the chamber 18 and is drivably connected to the compressor 16. The turbine motive gases discharge rearwardly from the turbine 22 through the duct 12 and into the surrounding atmosphere through a nozzle 24 at the rear or downstream end of said duct. The turbo-jet engine 10 may also have an afterburner 26 between the turbine 22 and nozzle 24.

For maximum fuel economy and engine performance, the nozzle 24 has a convergent-divergent profile with a variable throat area and an independently variable exit area. In the case of a turbo-jet engine, the provision of such an adjustable nozzle is particularly important when said engine is provided with an afterburner.

The nozzle 24 and the portion of the duct 12 adjacent thereto have a rectangular cross-section and said nozzle is generally similar to the nozzle disclosed in the aforementioned copending application. Thus, the nozzle 24 comprises an upstream portion formed by a pair of opposed movable nozzle plates 28 extending between a pair of opposed fixed parallel side walls 30 of the downstream duct portion 12. The downstream portion of the nozzle 24 is formed by a pair of opposed movable nozzle plates 32 also extending between said side walls 30. Each upstream nozzle plate 28 is pivotally connected at 34 to the adjacent downstream nozzle plate 32 to form the nozzle throat whereby the nozzle plates 28 from the convergent flow portion of the nozzle and the nozzle plates 32 form the divergent flow portion of the nozzle.

The upstream end of each nozzle plate 28 is pivotally connected to the duct 12 at 38. In addition each plate 28 has an extension 40 which is connected to a piston rod of a fluid motor piston 42 whereby the nozzle throat area $A_t$ can be varied by moving the piston 42. The piston 42 is slidable within a cylinder and passages 44 and 46 provide for the admission of fluid pressure to either end of the piston cylinder while the other end of said cylinder is vented. Thus the nozzle throat area $A_t$ can be regulated by controlling the relief and application of pressure to the fluid motor passages 44 and 46. For example, said area $A_t$ of the nozzle throat may be regulated so as to maintain the speed of the turbine 22 constant. However the specific manner in which the nozzle throat area $A_t$ is varied forms no part of the invention.

As described, the diverging nozzle plates 32 are pivotally connected to the upstream nozzle plates 28 at the nozzle throat whereby said diverging nozzle plates are pivotally movable to vary the nozzle exit area $A_e$ independently of the nozzle throat area $A_t$. In order to move the diverging nozzle plates 32, each said plate is slidingly and pivotally connected to one end of a bell crank lever 48 by means of a pin 50 on said lever end, said pin 50 being received in a slot 52 in the downstream end of the associated nozzle plate. Each bell crank lever 48 is pivotally supported intermediate its ends and the other end of said bell crank lever is connected to the piston rod of a fluid motor piston 54. A servo mechanism 56 controls the admission of a fluid under pressure to one side or the other of the piston 54 through one or the other of passages 60 and 62 while the other of said passages is vented. Motion of the piston 54 to the right, as viewed in the drawing, decreases the nozzle exit area $A_e$ independently of the nozzle throat area $A_t$. Likewise motion of the piston 54 to the left increases the nozzle exit area $A_e$ independently of the nozzle throat area $A_t$.

For maximum forward pressure force or thrust of the exhaust gases on the diverging portion of the nozzle, the exit area $A_e$ of the nozzle should be adjusted so that the exhaust gases expand through said portion approximately down to the pressure of the surrounding atmosphere. It can be shown that this is so if the ratio of the nozzle exit area $Ae$ to the nozzle throat area $At$ is equal to a certain function of the ratio of the total pressure $Pt$ of the exhaust gases immediately upstream of the nozzle to the static pressure $Pa$ of the surrounding atmosphere. That is, $$\frac{Ae}{At} = f\left(\frac{Pt}{Pa}\right)$$

where $$f\left(\frac{Pt}{Pa}\right)$$

designates a specific function of the ratio of the pressure $Pt$ to the pressure $Pa$. The exact nature of this function can be found in textbooks on the subject. For example, on page 34 of a book entitled "Introduction to Aerodynamics of a Compressible Fluid," by Liepmann and Puckett and published in 1947 by John Wiley and Sons, this functional relationship in effect is expressed as follows:

$$\left(\frac{Ae}{At}\right)^2 = \frac{\gamma-1}{2} \frac{\left(\frac{2}{\gamma+1}\right)^{(\gamma+1)/(\gamma-1)}}{\left(\frac{Pa}{Pt}\right)^{2/\gamma}\left[1-\left(\frac{Pa}{Pt}\right)^{(\gamma-1)/\gamma}\right]}$$

where $\gamma$ is the ratio of the specific heat of the exhaust gases at constant pressure to the specific heat at constant volume.

In accordance with the invention, the pressures $Pt$, $Pa$ and the nozzle throat area $At$ are measured and the nozzle exit area $Ae$ is automatically regulated independently of the nozzle throat area $At$ so that the above relation between these factors is satisfied. When this is so, the engine exhaust gases expand through the nozzle diverging portion down to the pressure of the surrounding atmosphere whereupon the forward pressure force of the exhaust gases on said diverging nozzle portion is a maximum. A block diagram of a control system for so regulating the nozzle exit area is illustrated in Fig. 1.

As illustrated in Fig. 1, a total pressure tube 70 is disposed in the duct 12 immediately upstream of the nozzle 24 and directed in an upstream direction relative to the flow of the exhaust gases for measuring the total pressure $Pt$ of said gases. This pressure is transmitted by a line 72 as a pressure signal to a computer mechanism 74. A static pressure tube 76 is disposed so as to be responsive to the free stream pressure $Pa$ of the atmosphere surrounding the aircraft engine. This static pressure is transmitted as a pressure signal by a line 78 to the computer mechanism 74. The computer mechanism takes the input signals of $Pt$ and $Pa$ and provides an output signal which is a measure of the ratio $Pt/Pa$. This latter pressure ratio signal is fed into a so-called characterizing box 80 as schematically indicated by the line 82. The characterizing box 80 modifies said pressure ratio signal to provide an output signal equal to the aforedescribed function of said ratio, $f(Pt/Pa)$. Since it is desired to maintain the nozzle area ratio $Ae/At$ equal to this modified pressure ratio signal the output of the characterizing box is a signal of the desired nozzle area ratio $Ae/At$. This latter nozzle area ratio signal is fed into a second computer mechanism 84 as schematically indicated by a line 86. A signal of the actual nozzle throat area $At$ is also fed into the computer mechanism 84 by a connection, schematically indicated by the line 88, with the nozzle throat controlling piston 42. The computer mechanism 84 multiplies the signal of the desired nozzle area ratio $Ae/At$ with the signal of the actual nozzle throat area $At$ to provide an output signal of the desired nozzle exit area $Ae$. This output signal of the desired $Ae$ is fed into a comparator 90, as schematically indicated by a line 92. In addition a signal of the actual nozzle exit area $Ae$, as provided by a connection (schematically indicated by the line 94) with the nozzle exit area control piston 54, is fed into the comparator 90. The comparator 90 compares the signals of the desired and actual nozzle exit area $Ae$ and provides an output signal which is a function of their difference. This output signal is termed the nozzle exit area $Ae$ error signal and this error signal is supplied to the servo mechanism 56, by a connection indicated by the line 96, to cause the piston 54 to operate and adjust the nozzle exit area so that the actual nozzle exit area $Ae$ is equal to the desired value.

Obviously the nozzle area control mechanism illustrated by block diagram in Fig. 1 could assume various forms. Thus this mechanism could involve hydraulic, pneumatic and/or electric circuits. A particular electric circuit arrangement of a control mechanism for carrying out the invention is illustrated in Fig. 2.

Fig. 2 is identical with Fig. 1 except for the details of and connections to the blocks 56, 74, 80, 84 and 90. Therefore identical reference numerals have been used to designate the corresponding parts of Figs. 1 and 2.

As illustrated in Fig. 2, the computer mechanism 74 comprises a flexible bellows 100 into which the total pressure signal $Pt$ is transmitted by the line 72. One end of the bellows 100 is anchored and the other end of said bellows is connected to a potentiometer wiper arm 102 which is movable across a potentiometer resistance 104. The potentiometer resistance 104 is connected across the secondary of a transformer 106 while the primary of said transformer is connected to an electric alternating current source E. The resistance 104 is uniformly wound so that anywhere along the path of travel of the potentiometer wiper arm 102 the same magnitude of resistance is included between any two equally spaced points along said path. Therefore the voltage E1, between the wiper arm 102 and one end of the potentiometer resistance 104 is proportional to the pressure $Pt$. As illustrated, said resistance end is grounded.

The computer mechanism also includes a second flexible bellows 108 into which the static pressure signal $Pa$ is transmitted by the line 78. One end of the bellows 108 is anchored and the other end of said bellows is connected to a potentiometer wiper arm 110 movable across a potentiometer resistance 112. The potentiometer 112 is connected across the secondary of a transformer 114 the primary of which is also connected to the alternating source E. The potentiometer resistance 112 is also uniformly wound so that the voltage E2 between the wiper arm and one end of the resistance 112 is proportional to the pressure $Pa$ and as illustrated said resistance end is grounded.

Also included in the computer mechanism 74 is a potentiometer resistance 116. This resistance 116 is uniformly wound and is connected across the wiper arm 110 and the grounded side of the potentiometer resistance 112. A wiper arm 118, carried by a shaft 120, is movable along the resistance 116 and E3 designates the voltage between said arm 118 and ground. The shaft 120 is connected to a conventional reversible two phase electric motor 122. The one winding 124 of said two phase motor is grounded at one end and its other end is connected to the wiper arms 102 and 118 through like resistances 126. The other winding 128 of the two phase motor 122 is connected across the secondary of a transformer 130 whose primary is also connected to the alternating current source E. The circuit of the winding 128 includes the usual 90° phase shifting means indicated by the condenser 132.

As illustrated, the primaries of the transformers 106 and 114 are connected so that the voltages E1 and E3 are 180° out of phase. Because of this 180° phase relationship of the voltages E1 and E3, when said voltages are equal in magnitude no current flows through the motor winding 124 and the motor 122 does not operate. If, however, one of the voltages E1 and E3 is greater than the other then a current flows through the motor winding 124 and said current either leads or lags (by approximately 90°) the current in the other motor winding 128 whereupon the motor 122 operates in one direction or the other depending on which of said voltages is the largest. The motor windings 124 and 128 are connected so that if voltage E1 is larger than E3 the motor 122 runs in a direction to increase E3 until said voltages are again equal in magnitude. That is, the motor 122 automatically operates to keep the voltage E3 equal to the voltage E1.

As previously stated the voltage E1 is proportional to $Pt$ and the voltage E2 is proportional to $Pa$. Also if S is the displacement of the shaft 120 then the voltage E3 is proportional to the product of S and $Pa$. Therefore $$E1 = APt$$
$$E3 = BSPa$$

where A and B are constants. Since the motor 122 automatically moves the potentiometer wiper arm 118 to maintain E3 equal to E1 it follows that $$APt = BSPa$$

or $$S = C\frac{Pt}{Pa}$$

where C is a constant. Thus the rotative displacement of the shaft 120 is a signal of the pressure ratio $Pt/Pa$.

The shaft 120 extends into the characterizing box 80 thereby transmitting the pressure ratio signal $Pt/Pa$ to said box. In this sense the shaft 120 corresponds to the schematic connection 82 of Fig. 1.

The characterizing box 80 includes a potentiometer wiper arm 134 to which the shaft 120 is connected. The wiper arm 134 is movable along a non-uniformly wound potentiometer resistance 136. The non-uniform nature of the resistance 136 is hereinafter described. The potentiometer resistance 136 is connected across the secondary of a transformer 138, the primary of which is connected to the alternating current source E. Therefore the voltage E4 between the wiper arm 134 and one side (the grounded side) of the potentiometer resistance 136 is a function of the displacement of said wiper arm and the nature of this function depends on the non-uniform nature of said resistance 136. The displacement of the wiper arm 134 is equal to the displacement S of the shaft 120 whereby $$E4 = f(S)$$

but $$S = C\frac{Pt}{Pa}$$

so that $$E4 = f\left(\frac{Pt}{Pa}\right)$$

Obviously the voltage signal E4 can be made equal to any desired function of the pressure ratio $Pt/Pa$ by properly winding the resistance 136. As previously stated, if the nozzle area ratio $Ae/At$ is maintained equal to a certain specified function of said pressure ratio then the exhaust gases will expand through the diverging nozzle portion 32 down to the surrounding atmosphere whereupon the forward pressure force of said exhaust gases on said diverging nozzle portion will be a maximum. The resistance 136 is wound so that the voltage E4 is equal to this previously specified function of said pressure ratio whereupon $$E4 = f\left(\frac{Pt}{Pa}\right) = \frac{Ae}{At}$$

The voltage signal E4 is fed into the computer mechanism 84 by a wire 140 so that said wire corresponds to the schematic connection 86 of Fig. 1.

The computer mechanism 84 includes a uniformly wound potentiometer resistance 142 over which a potentiometer wiper arm 144 is movable. The wire 140 is connected to one end of the resistance 142 and the other end of said resistance is grounded. The potentiometer arm 144 is connected to the nozzle throat area regulating piston 42 by means 146 including a bell crank lever 148 whereby the displacement of the wiper arm 144 is proportional to the actual throat area $At$ of the nozzle. Thus the means 146 and bell crank lever 148 supply the computer 84 with a signal of the actual nozzle throat area $At$ and therefore said means 146 and lever 148 correspond to the connection 88 of Fig. 1. The voltage E5 between the wiper arm 144 and ground is proportional to the product of the voltage E4 and the displacement of the wiper arm 144. As previously stated, the voltage E4 is proportional to the desired nozzle area ratio $Ae/At$ and the displacement of the wiper arm 144 is proportional to the actual value of $At$ so that $$E5 = DAt\frac{Ae}{At} = DAe$$

where D is a constant. Therefore E5 is a voltage signal whose magnitude is proportional to the theoretically required value of $Ae$ such that the exhaust gases will expand through the diverging nozzle portion down to the pressure of the surrounding atmosphere.

The voltage signal E5 of the desired magnitude of $Ae$ is fed into the comparator 90 by a wire 150 so that said wire corresponds to the connection 92 of Fig. 1. The comparator 90 includes a uniformly wound potentiometer wiper arm 152 movable along a potentiometer resistance 154 which is connected across the secondary of a transformer 156 with one end of said resistance being grounded. The primary of the transformer 156 is connected to the source of electric energy E so that the voltage E5 is 180° out of phase with the voltage E6 between the wiper arm 152 and the grounded end of the resistance 154.

A signal of the actual magnitude of the nozzle exit area $Ae$ is fed into the comparator 90 by a connection 158, including a bell crank lever 160, between the potentiometer wiper arm 152 and the nozzle exit area regulating piston 54. Thus the connection 158 and its bell crank lever 160 corresponds to the connection 94 of Fig. 1 and the voltage E6 is proportional to the actual magnitude of $Ae$.

The comparator 90 also includes a conventional two-phase reversible electric motor 162. One winding 164 of said motor is grounded at one end. The other end of the winding 164 is connected to the potentiometer wiper arm 144 through a resistance 166 and the wire 150 and is also connected to the potentiometer wiper arm 152 through a resistance 168 and wire 170, said resistances being equal. The other winding 172 of the motor 162 is connected across the secondary of a transformer 174 whose primary is connected to the alternating current source E. The circuit of the winding 172 includes the usual 90° phase shifting means indicated by the condenser 176. As previously noted, the voltages E5 and E6 are 180° out of phase so that the motor 162 will run in one direction or the other depending on which of said voltages is the largest. Furthermore since the voltages E5 and E6 are proportional to the desired and actual values, respectively, of the nozzle exit area $Ae$ the operation of the motor 162 provides a signal of any error in the actual setting of nozzle exit area $Ae$.

The motor 162 is connected to the servo mechanism 56 by the motor shaft 178 and rack and pinion gearing 180 thereby transmitting the $Ae$ error signal to said mechanism 56. Thus the motor shaft 178 and gearing 180 corresponds to the connection 96 of Fig. 1. The servo mechanism 56 includes a servo valve 182 connected to the rack of the gearing 180 whereby the valve 182 moves in one direction or the other depending on the direction of operation of the motor 162. The servo valve 182 controls the admission of a fluid under pressure from a supply passage 184 to the passages 60 and 62. In the neutral position illustrated, the servo valve 182 closes both passages 60 and 62. Upon movement of the servo valve 182 to the right, from its neutral position, fluid under pressure is admitted through the passage 62 to the right side of the piston 54 while the passage 60 is vented thereby causing the piston 54 to move to the left to increase the nozzle exit area Ae independently of the nozzle throat area At. Likewise, upon motion of the servo valve 182 to the left, from its neutral position, fluid under pressure is admitted through the passage 60 to the left side of the piston 54 while the passage 62 is vented thereby causing the piston 54 to move to the right to decrease the nozzle exit area Ae independently of its throat area At. The motor 162 is connected to the servo valve 182 so that whenever the voltage E6 differs from E5 said motor operates to adjust the nozzle exit area Ae in a direction to rebalance said voltages. Therefore, since the voltages E5 and E6 are proportional to the desired and actual values, respectively, of the nozzle exit area Ae, said nozzle exit area is automatically maintained equal to the theoretically desired value as determined by the measured values of Pt, Pa and At such that the exhaust gases expand through the diverging nozzle portion down to the pressure of the surrounding atmosphere.

In the above discussion it has been assumed that the circuit connected in parallel with the portion of a potentiometer resistance between the one end of said resistance and its wiper arm has little or no effect on the voltage applied to said parallel circuit by said potentiometer portion. Because of the loading effect of each such parallel circuit on its potentiometer this assumption is only true if the resistance of said parallel circuit is large compared to the resistance of its potentiometer. Therefore, for accuracy of the output signal of each device 74, 80, 84 and 90 the resistance of each such parallel circuit of said device should be made large compared to the resistance of its potentiometer. In addition this loading effect of each parallel circuit on its potentiometer can be minimized by using a circuit arrangement such as disclosed in Fig. 5 of an article by William Shannon entitled "Electronic Computers" and appearing on pages 110–113 inclusive of the August 1946 issue of Electronics Magazine. It is again emphasized, however, that the specific details of the electric circuit form no part of the present invention.

Except for pressure losses, the total pressure Pt' in the duct 12 immediately downstream of the turbine 22, but upstream of the afterburner 26, is the same as the total pressure Pt in said duct immediately upstream of the nozzle 24 but downstream of the afterburner 26. Furthermore, when the afterburner 26 is operating the temperature is considerably higher at the nozzle 24 than it is immediately downstream of the turbine 22 so that the pressure Pt' is easier to measure than the pressure Pt. Therefore if the pressures Pt and Pt' are substantially proportional the system of Figs. 1 and 2 may be modified as illustrated in Fig. 3, by substituting the total pressure Pt' in the duct 12 immediately downstream of the turbine 22 for the pressure Pt used in Figs. 1 and 2. The engine nozzle and nozzle exit area control of Fig. 3 is otherwise identical to that of Figs. 1 and 2 and the parts of Fig. 3 have been designated by the same reference numerals, but with a subscript a added thereto, as the corresponding parts of Figs. 1 and 2. Accordingly no further description of Fig. 3 is deemed necessary and it is apparent that in Fig. 3, as in Figs. 1 and 2, the nozzle exit area is controlled so that the engine exhaust gases expand through the diverging nozzle portion down to approximately the pressure of the surrounding atmosphere.

If the pressures Pt' and Pt are not substantially proportional the exact functional relation between these two pressures could be determined experimentally for a particular jet engine installation. Having determined the relation between the pressures Pt' and Pt and if other variables do not affect this relation too much, the difference between Pt' and Pt could be taken into account in Fig. 3 by so winding the potentiometer resistance 104a (not illustrated in Fig. 3 but corresponds to potentiometer resistance 104 of Fig. 2) so that although the position of its wiper arm was proportional to Pt', the voltage between said wiper arm and the grounded end of said resistance (E1 in Fig. 2) was proportional to Pt.

The invention is not limited to a turbo-jet engine and instead is applicable to other types of jet engines. Fig. 4 illustrates the invention applied to a ram-jet engine.

A ram-jet engine 200 is schematically illustrated in Fig. 4 as comprising a duct 202 having a center body 204 supported therein at the forward end of said duct and forming a forwardly directed annular air entrance opening. Burner apparatus for the ram-jet engine combustion chamber 206 is schematically indicated at 208, said apparatus supplying fuel for combustion with the air entering the duct 202. The combustion gases discharge rearwardly into the surround atmosphere through a nozzle disposed at the rear end of the duct 202. In Fig. 4 the ram-jet engine nozzle and the nozzle exit area control mechanism are identical with that illustrated in Figs. 1 and 2 and the parts of the nozzle and its control mechanism of Fig. 4 have been designated by the same reference numerals but with a subscript b added thereto as the corresponding reference numerals of Figs. 1 and 2. Thus no further description of Fig. 4 is necessary and it is apparent that in Fig. 4, as in Figs. 1 and 2, the exit area of the engine exhaust nozzle is varied independently of the nozzle throat area so that the exhaust gases expand through the diverging nozzle portion down to the pressure of the surrounding atmosphere.

As in the case of the turbo-jet engine, the manner in which the throat area of the ram-jet exhaust nozzle is varied forms no part of the invention. For example, in the case of a ram-jet engine said throat area may be varied in response to changes in flight Mach number, changes in the air inlet temperature and/or changes in the exhaust gas temperature.

At any point within a ram-jet duct, the total pressure of the gases flowing therethrough, is equal to the total pressure Pt of said gases at a point immediately upstream of the exhaust nozzle except for pressure losses between said points. Accordingly the structure of Fig. 4 may be modified by substituting the total pressure anywhere along the ram-jet duct in a manner similar to the modification of Figs. 1 and 2 illustrated in Fig. 3. Furthermore, as discussed in connection with Fig. 3, if said substituted total pressure is not substantially proportional to the pressure Pt immediately upstream of the exhaust nozzle this may be taken into account by properly winding the potentiometer resistance whose wiper arm responds to this pressure.

Power control systems of aircraft jet engines frequently employ a flight Mach number signal which is obtained from the total pressure of the adjacent free air stream relative to the aircraft and the static pressure of said air stream or surrounding atmosphere. In the case of a ram-jet engine, except for pressure losses through the ram-jet duct, said free air stream total pressure is equal to the total pressure Pt of the engine gases immediately upstream of the engine exhaust nozzle. Accordingly Fig. 4 may be also modified by using the total pressure of the surrounding free air stream in place of the total pressure Pt of the gases upstream of the exhaust nozzle. This modification is illustrated in Fig. 5.

Fig. 5 illustrates a jet engine 300 comprising a duct 302 having a forwardly directed air entrance opening 304 and having a variable area exhaust nozzle disposed at the rear or discharge end of said duct. Said exhaust nozzle and the nozzle exit area control mechanism are identical with the nozzle and control mechanism of Figs. 1, 2, 3 and 4 except the total pressure of the surrounding air relative to the aircraft engine is substituted for the total pressure measurement of Figs. 1, 2, 3 and 4. Accordingly, the parts of the nozzle and control mechanism therefor of Fig. 5 are designated by the same reference numerals, but with a subscript c substituted for the subscript b, as the corresponding parts of Fig. 4. Thus in Fig. 5 reference numbr 70c designates a total pressure tube for measuring the total pressure of the surrounding airstream relative to the engine while, in Fig. 4, tube 70b measures the total pressure of the engine exhaust gases immediately upstream of the exhaust nozzle. Fig. 5 may otherwise be identical to Fig. 4.

In the case of a turbo-jet engine, the total pressure of the surrounding air stream relative to the aircraft, in general is not related to the total pressure $P_t$ of the exhaust gases immediately upstream of the exhaust nozzle in a manner as simple as it is in the case of a ram-jet engine. Nevertheless, at least in some turbo-jet installations, said total pressure of the surrounding air stream may be a sufficiently accurate measure of said pressure $P_t$ so that the system of Fig. 5 could also be used in the case of a turbo-jet engine with the result that the nozzle exit area would be automatically controlled so that the exhaust gases expand through the diverging nozzle portion down to approximately the pressure of the surrounding atmosphere. Accordingly in Fig. 5 engine 300 may be either a ram-jet or a turbo-jet engine. Furthermore, as discussed in connection with Figs. 3 and 4, where a pressure is substituted in the nozzle exit area control mechanism of Figs. 1 and 2 for the total pressure $P_t$ of the engine gases immediately upstream of the exhaust nozzle, it may be possible to correct for relative changes in said pressures by properly winding the potentiometer resistance whose wiper arm responds to said substituted pressure so that the potentiometer provides a voltage proportional said pressure $P_t$.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications.

We claim as our invention:

1. In combination with an aircraft jet engine having a convergent-divergent nozzle through which the engine exhaust gases discharge for providing the engine with forward propulsive thrust, said nozzle having an adjustable exit area; means providing a signal which is a predetermined function of the total pressure of the exhaust gases upstream of the nozzle throat and the static pressure of the surrounding atmosphere; and means responsive to said signal and operatively connected to said nozzle for regulating the nozzle exit area such that an increase in said total pressure of the exhaust gases and a decrease in said static pressure of the surrounding atmosphere both tend to effect an opening adjustment of the nozzle exit.

2. In combination with an aircraft jet engine having a convergent-divergent nozzle through which the engine exhaust gases discharge for providing the engine with forward propulsive thrust, said nozzle having an adjustable throat area and an adjustable exit area; means providing a first signal which is a function of a condition indicative of engine performance; means providing a second signal which is a measure of the throat area of said nozzle; and means responsive to said signals and operatively connected to said nozzle for regulating the nozzle exit area.

3. In combination with an aircraft jet engine having a convergent-divergent nozzle through which the engine exhaust gases discharge for providing the engine with forward propulsive thrust, said nozzle having an adjustable throat area and an adjustable exit area; means providing a control signal; means providing a second signal which is a measure of the throat area of said nozzle; and means responsive to said signals and operatively connected to said nozzle for regulating the nozzle exit area so that a predetermined relation is maintained between said control signal and the ratio of the nozzle exit area to the nozzle throat area.

4. In combination with an aircraft jet engine having a convergent-divergent nozzle through which the engine exhaust gases discharge for providing the engine with forward propulsive thrust, said nozzle having an adjustable throat area and an adjustable exit area; means for providing a signal which is a function of the flight speed of the engine; means for providing a second signal which is a measure of the throat area of said nozzle; and means responsive to said signals and operatively connected to said nozzle for regulating the nozzle exit area.

5. In combination with an aircraft jet engine having a convergent-divergent nozzle through which the engine exhaust gases discharge for providing the engine with forward propulsive thrust, said nozzle having an adjustable throat area and an adjustable exit area; means for providing a signal which is a function of the ratio of the total exhaust gas pressure upstream of the nozzle throat and the static pressure of the surrounding atmosphere; means for providing a second signal which is a measure of the throat area of said nozzle; and means responsive to said signals and operatively connected to said nozzle for regulating the nozzle exit area.

6. In combination with an aircraft jet engine having a convergent-divergent nozzle through which the engine exhaust gases discharge for providing the engine with forward propulsive thrust, said nozzle having an adjustable throat area and an adjustable exit area; means including a total head tube for providing a signal which is a measure of the exhaust gas total pressure upstream of the nozzle throat; means including a static pressure tube for providing a signal which is a measure of the static pressure of the surrounding atmosphere; and means responsive to a predetermined function of said signals and operatively connected to said nozzle for regulating the nozzle exit area such that an increase in said total pressure of the exhaust gases and a decrease in said static pressure of the surrounding atmosphere both tend to effect an opening adjustment of the nozzle exit.

7. In combination with an aircraft jet engine having a convergent-divergent nozzle through which the engine exhaust gases discharge for providing the engine with forward propulsive thrust said nozzle having an adjustable throat area and an adjustable exit area; means for providing a first signal which is a measure of the total pressure of the exhaust gases upstream of the nozzle throat; means for providing a second signal which is a measure of the static pressure of the surrounding atmosphere; means for providing a third signal which is a measure of the nozzle exit area; means providing a fourth signal which is a measure of the nozzle throat area; and means responsive to said signals and operatively connected to said nozzle for regulating the nozzle exit area to maintain a predetermined relation between the ratio of said first and second signals and the ratio of said third and fourth signals.

8. In combination with an aircraft jet engine having a convergent-divergent nozzle through which the engine exhaust gases discharge for providing the engine with forward propulsive thrust said nozzle having an adjustable throat area and an adjustable exit area; means for providing a first signal which is a measure of the total pressure of the exhaust gases upstream of the nozzle throat; means for providing a second signal which is a measure of the static pressure of the surrounding atmosphere; means for providing a third signal which is a measure of the nozzle throat area; and means responsive to said signals and operatively connected to said nozzle for regulating the nozzle exit area such that by itself any increase in said first signal, decrease in said second signal and increase in said third signal each tends to cause an increase in the nozzle exit area.

9. In combination with an aircraft jet engine having a convergent-divergent nozzle through which the engine exhaust gases discharge for providing the engine with forward propulsive thrust said nozzle having an adjustable throat area and an adjustable exit area; means for providing a first signal which is a measure of the total pressure of the exhaust gases upstream of the nozzle throat; means for providing a second signal which is a measure of the static pressure of the surrounding atmosphere; means for providing a third signal which is a measure of the nozzle exit area; means providing a fourth signal which is a measure of the nozzle throat area; and means responsive to said signals and operatively connected to said nozzle for regulating the nozzle exit area such that by itself any increase in said first signal, decrease in said second signal, decrease in said third signal and increase in said fourth signal each tends to cause an increase in said nozzle exit area.

10. In combination with an aircraft jet engine having a convergent-divergent nozzle through which the engine exhaust gases discharge for providing the engine with forward propulsive thrust said nozzle having an adjustable throat area and an adjustable exit area; means for providing a first signal which is a measure of the ratio of a pressure indicative of engine performance and the static pressure of the surrounding atmosphere; means for deriving a second signal from said first signal which is a predetermined function of said ratio; means for providing a third signal which is a measure of the throat area of said nozzle; means for multiplying said second and third signals to provide a fourth signal; and means operatively connected to said nozzle and responsive to changes in said fourth signal for regulating the nozzle exit area so that an increase or decrease in said fourth signal results in an increase or decrease, respectively, in the nozzle exit area.

11. In combination with an aircraft jet engine having a convergent-divergent nozzle through which the engine exhaust gases discharge for providing the engine with forward propulsive thrust said nozzle having an adjustable throat area and an adjustable exit area; means for providing a first signal which is a measure of the ratio of a pressure indicative of engine performance and the static pressure of the surrounding atmosphere; means for deriving a second signal from said first signal which is a predetermined function of said ratio; means for providing a third signal which is a measure of the throat area of said nozzle; means for multiplying said second and third signals to provide a fourth signal; means for providing a fifth signal which is a measure of the exit area of the nozzle; and means responsive to the difference of said fourth and fifth signals and operatively connected to said nozzle for regulating the nozzle exit area to maintain said difference at a minimum value.

References Cited in the file of this patent

UNITED STATES PATENTS

| | | |
|---|---|---|
| 2,411,895 | Poole | Dec. 3, 1946 |
| 2,537,772 | Lundquist et al. | Jan. 9, 1951 |
| 2,563,270 | Price | Aug. 7, 1951 |
| 2,566,961 | Poole | Sept. 4, 1951 |
| 2,570,629 | Anxionnaz et al. | Oct. 9, 1951 |
| 2,603,062 | Weiler et al. | July 15, 1952 |
| 2,623,352 | Sedille et al. | Dec. 30, 1952 |
| 2,641,324 | Fortescue | June 9, 1953 |
| 2,671,620 | Andrews | Mar. 9, 1954 |